Feb. 19, 1952     R. H. LONGENECKER     2,586,546
DOUBLE LENS REMOVABLE UNIT FOR EYEGLASSES
Filed Feb. 17, 1950

INVENTOR.
RUTH HUSSEY LONGENECKER

Ostrolenk & Faber
By
ATTORNEYS

Patented Feb. 19, 1952

2,586,546

UNITED STATES PATENT OFFICE 2,586,546

DOUBLE LENS REMOVABLE UNIT FOR EYEGLASSES

Ruth Hussey Longenecker, Los Angeles, Calif.

Application February 17, 1950, Serial No. 144,662

4 Claims. (Cl. 88—41)

My present invention relates to eye glasses or spectacles and more particularly to an arrangement of spectacles whereby the lenses may readily be removed and interchanged.

More accurately, it is the spectacle frames which are intended to be interchangeable rather than the lenses since the average wearer of eye glasses may require a plurality of different types of frames for different occasions using, however, the same lens prescription.

Accordingly, by the utilization of my novel invention the user of eye glasses may be provided with a single pair of lenses and with a plurality of frames in which the lenses may be interchanged as often as is necessary in order that the eye glasses worn by the user be suitable either to the costume or the occasion.

More specifically, my invention is directed to the arrangement of a spectacle frame so that each of the lens openings is grooved and rabbeted to receive the lens as well as a spring clip holding the lens in place; the bridge of the spectacle frame is provided with a channel connecting the spring clips or frames for each of the lenses, the channel being so arranged that it provides the necessary spring pressure for holding the lenses in place.

Thus, the primary object of my invention is the provision of novel interchangeable lens mountings for spectacle frames.

The foregoing and many other objects of my invention will become apparent in the following description and drawings in which.

Referring to the figures, the spectacle frame 10 which may be of any suitable material is provided with appropriate lens openings 11, 12, a bridge 13, and lugs 14, 15 to which the temple pieces may be hingedly secured.

Figure 2:
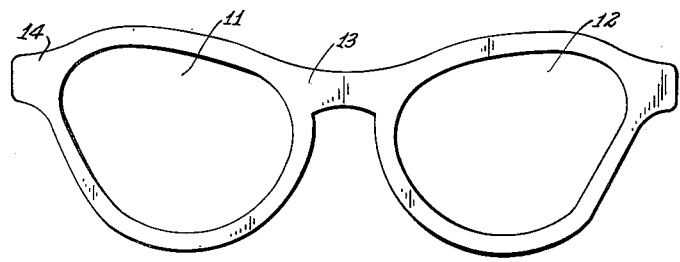
Figure 2 is a front view of the spectacle frame of Figure 1.

The front of the spectacle frame, as seen in Figure 2, may have any suitable standard appearance and may be decorated or otherwise shaped as the occasion requires.

Figure 1:
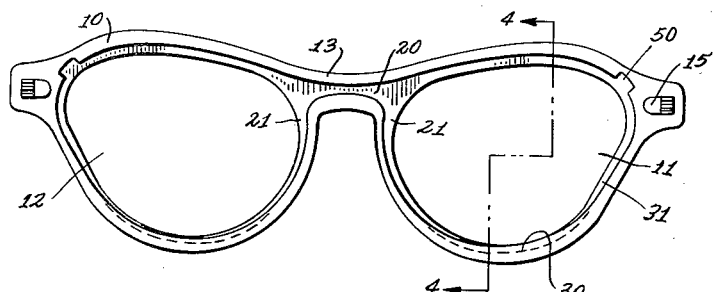
Figure 1 is a back view of a spectacle frame embodying my invention.
Figure 4:
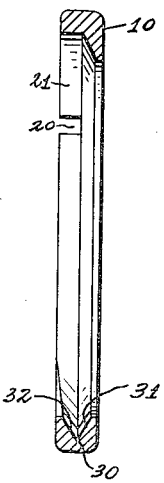
Figure 4 is a cross-sectional view taken on line 4—4 of Figure 1 looking in the direction of the arrows.
Figure 5:
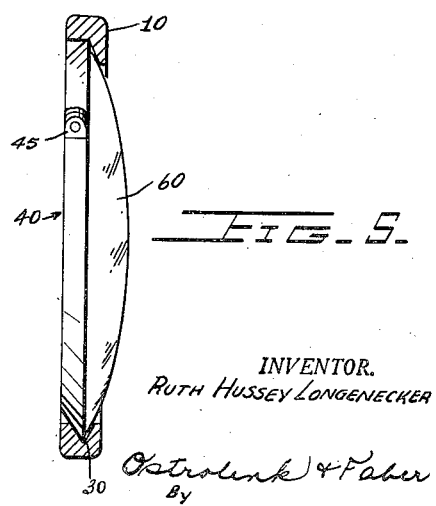
Figure 5 is a cross-sectional view corresponding to that of Figure 4 and showing the lens and lens holder in place.

The rear of the spectacle frame, as shown in Figure 1, is provided with a curved channel 20 in the bridge member 13 communicating with the circumferential recess 21 on each side. The recess 21 is so arranged that the lower portion thereof, as seen by the dotted lines of Figure 1 and in the cross-sectional views of Figures 4 and 5, is a full groove at 30 having the front wall 31 and a back wall 32. At the sides and top of the lens opening 11 and 12 on each side, the back wall 32 of the groove is omitted so that the front rabbet 31 or flange remains.

A lens, therefore, may be inserted into the spectacle frame by placing the lower edge of the lens in the groove 30 and swinging the top of the lens in against the rabbet 31.

Figure 3:
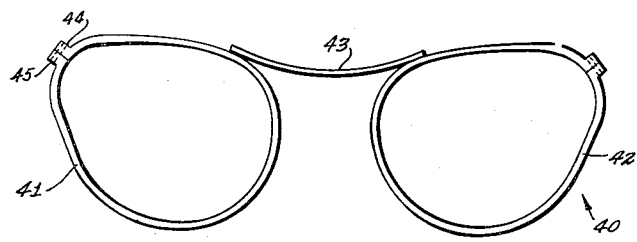
Figure 3 is a plan view of the securing device for holding the lenses in place.

The metallic clip shown in Figure 3 is then provided to hold the lenses in place. The metallic spring clip 40 of Figure 3 has lens clamping rings 41 and 42 connected by a downwardly bowed spring steel substantially flat member 43.

The lens clamping ring 41 may be made integral but preferably it consists of a wire, the ends of which are bent up at 44, 45 and riveted or screwed together on each side.

When the member 40 is snapped into the rear of the lens frame behind the lenses, the lens rings 41 and 42 must be bent downwardly toward each other so that the flat spring 43 will enter into the channel 20.

The flanges 44, 45 on each side then register with the recess 50 on each side in the lens frame communicating with the lens opening 11, 12.

After the retainer member 40 is snapped into position, the resilience of leaf spring 43 drives the lens clamping rings 41, 42 back to their original position, thereby frictionally engaging the retainer member 40 in the lens frame, particularly by the interengagement of the flat spring bridging member 43 in the channel 20 in bridge 13 and also by driving the outer sides of the lens rings 41 against the outer sides of the lens openings 11 and 12. This retains the lenses 60 in position.

In order to change lenses, the user need merely snap out the lens retaining member 40 by reversing the procedure previously described, take out lenses 60, insert the lenses in another spectacle frame and reinsert the retaining member 40.

By this means, therefore, a simplified method is provided for making it possible to use the same pair of prescription lenses with a multiplicity of frames so that the particular frame used will be appropriate to the occasion.

In the foregoing I have described my invention solely in connection with specific illustrative embodiments thereof. Since many variations and modifications of my invention will now be obvious to those skilled in the prior art, I prefer to be bound not by the specific disclosures herein contained but only by the appended claims.

I claim:

1. A spectacle frame having a bridge piece and lens openings, said lens openings each having a lens retaining groove at the bottom and a lens retaining rabbet at the forward side of the lens opening; a transverse arcuate channel in said bridge communicating with said lens openings; a lens retainer comprising a pair of rings each shaped to fit in the groove and behind the rabbet of each lens opening; a bowed transversely flat leaf spring member connecting said lens rings; said spring member being normally bowed on an arc of different radius than that of the bridge channel; said lens retainer being insertable in said frame with said spring member deformed to enter said channel; said spring member frictionally engaging said channel and driving said lens rings into frictional engagement with the groove and rabbet of the lens opening, so as to wedge respective lenses between surfaces of said rabbet and forward edges of said rings.

2. A spectacle frame having a bridge piece and lens openings, said lens openings each having a lens retaining groove at the bottom and a lens retaining rabbet at the forward side of the lens opening; a transverse arcuate channel in said bridge communicating with said lens openings; a lens retainer comprising a pair of rings each shaped to fit in the groove and behind the rabbet of each lens opening; a bowed spring member connecting said lens rings; said spring member being normally bowed on an arc of different radius than that of the bridge channel; said lens retainer being insertable in said frame with said spring member deformed to enter said channel; said spring member frictionally engaging said channel and driving said lens rings into frictional engagement with the groove and rabbet of the lens opening, so as to wedge respective lenses between surfaces of said rabbet and forward edges of said rings.

3. A spectacle frame having a bridge piece and lens openings, said lens openings each having a lens retaining groove at the bottom and a lens retaining rabbet at the forward side of the lens opening; a transverse arcuate channel in said bridge communicating with said lens openings; a lens retainer comprising a pair of rings each shaped to fit in the groove and behind the rabbet of each lens opening; a bowed spring member connecting said lens rings; said spring member being normally bowed on an arc of different radius than that of the bridge channel; said lens retainer being insertable in said frame with said spring member deformed to enter said channel; lateral extensions from said rings at the outer upper sides of each thereof; an additional recess adjacent each lens opening corresponding to said lateral extension; said spring member frictionally engaging said channel and driving said lens rings into frictional engagement with the groove and rabbet of the lens opening, so as to wedge respective lenses between surfaces of said rabbet and forward edges of said rings.

4. A spectacle frame having a bridge piece and lens openings, said lens openings each having a lens retaining groove at the bottom and a lens retaining rabbet at the forward side of the lens opening; a transverse arcuate channel in said bridge communicating with said lens openings; a lens retainer comprising a pair of rings each shaped to fit in the groove and behind the rabbet of each lens opening so as to wedge respective lenses between surfaces of said rabbet and forward edges of said rings; a bowed spring member connecting said lens rings; said spring member being normally bowed on an arc of different radius than that of the bridge channel; said lens retainer being insertable in said frame with said spring member deformed to enter said channel; lateral extensions from said rings at the outer upper sides of each thereof; an additional recess adjacent each lens opening corresponding to said lateral extension; said spring member driving said lens rings upwardly, said lateral extensions being driven upwardly; each lens ring being thereby held frictionally at the side of the lens opening adjacent the bridge and at the lateral extension; and each lens ring being also positioned by the groove.

RUTH HUSSEY LONGENECKER.

REFERENCES CITED

The following references are of record in the file of this patent:

UNITED STATES PATENTS

| Number | Name | Date |
|---|---|---|
| 1,659,165 | Sangren | Feb. 14, 1928 |
| 2,284,630 | Banks | June 2, 1942 |
| 2,524,140 | Retz | Oct. 3, 1950 |

FOREIGN PATENTS

| Number | Country | Date |
|---|---|---|
| 773,913 | France | Sept. 10, 1934 |